United States Patent [19]

Peter et al.

[11] Patent Number: 6,154,713

[45] Date of Patent: Nov. 28, 2000

[54] METHOD FOR CONTROLLING A COORDINATE MEASURING IN ACCORDANCE WITH DESIRED DATA

[75] Inventors: Heinz Peter, Ulm; Ulrich Staaden, Aalen, both of Germany

[73] Assignee: Carl-Zeiss-Stiftung, Heidenheim, Germany

[21] Appl. No.: 09/045,951

[22] Filed: Mar. 23, 1998

[30] Foreign Application Priority Data

Mar. 21, 1997 [DE] Germany ............................ 197 12 029

[51] Int. Cl.[7] .............................. G05B 19/19; G01B 5/008
[52] U.S. Cl. ............................... 702/95; 33/504; 702/168
[58] Field of Search .............................. 702/95, 150, 151, 702/152, 153, 168; 33/503, 504, 505

[56] References Cited

U.S. PATENT DOCUMENTS

| | | |
|---|---|---|
| 4,852,402 | 8/1989 | Bertz . |
| 4,888,877 | 12/1989 | Enderle et al. . |
| 5,020,001 | 5/1991 | Yamamoto et al. . |
| 5,204,824 | 4/1993 | Fujimaki ............................ 364/474.03 |
| 5,285,397 | 2/1994 | Heier et al. ............................ 364/559 |
| 5,461,797 | 10/1995 | Royer et al. . |
| 5,471,406 | 11/1995 | Breyer et al. ............................ 364/559 |
| 5,726,917 | 3/1998 | Staaden . |
| 5,758,429 | 6/1998 | Farzan et al. ............................ 33/503 |
| 5,768,138 | 6/1998 | Ruotolo ............................ 364/474.28 |
| 5,797,191 | 8/1998 | Ziegert ............................ 33/503 |
| 5,848,477 | 12/1998 | Wiedmann et al. ............................ 33/503 |

FOREIGN PATENT DOCUMENTS

| | | |
|---|---|---|
| 0131537 | 9/1987 | European Pat. Off. . |
| 0344304 | 2/1993 | European Pat. Off. . |
| 0762247 | 3/1997 | European Pat. Off. . |
| 0762250 | 3/1997 | European Pat. Off. . |
| 617264 | 5/1980 | Switzerland . |

OTHER PUBLICATIONS

"Coordinated Motion of Arc Welding Robots Using Parallel Data Processor" by F. Kasagami et al, Nov. 1992, IEEE.

Primary Examiner—Patrick Assouad
Attorney, Agent, or Firm—Walter Ottesen

[57] ABSTRACT

The invention is directed to a method for controlling a coordinate measuring apparatus in accordance with desired data utilizing a movably journalled probe which continuously scans the surface of a workpiece in a scanning point in a preferred measurement direction ($\vec{M}$). Either the probe or the workpiece therefore additionally rotatably journalled about at least one rotational axis having a first alignment. Geometric data are processed which include at least points (Pai, Pbi) on the surface of the workpiece with the points (Pai, Pbi) defining a line to be scanned. Control data (Lai, Lαi and/or Lbi, Lβi) from the geometric data are computed for controlling the measuring sequence in such a manner that, for measuring the workpiece, the workpiece and/or the probe are rotated about the rotational axis.

25 Claims, 6 Drawing Sheets

METHOD FOR CONTROLLING A COORDINATE MEASURING IN ACCORDANCE WITH DESIRED DATA

FIELD OF THE INVENTION

The invention relates to a method for controlling coordinate measuring apparatus in accordance with desired data with a movably journalled probe head. The probe head is guided in one scanning point continuously over the surface of a workpiece to be measured with a preferred measuring direction. The probe head and/or the workpiece is additionally rotatably journalled about at least one rotational axis.

BACKGROUND OF THE INVENTION

Methods of this kind are known from the state of the art in great variation and are primarily utilized in measuring apparatus for gearing. With these measuring apparatus, the involute profiles of the tooth flanks of the gear wheels can be measured.

U.S. Pat. No. 4,852,402, for example, discloses such a method for measuring the involute teeth of a gear wheel. For this purpose, the gear wheel to be measured is arranged on a rotational unit which rotates the gear wheel to be measured. Furthermore, a probe, which measures in a measuring axis, is passed by the teeth flanks of the gear wheel in such a manner that the probe moves over the tooth flanks of the rotating gear wheel and always scans the tooth flanks in one and the same preferred measuring direction. In order to always maintain the preferred measuring direction, the probe is guided by the mimic on a tangent to the base circle of the gear wheel. Here, the mathematical definition of the involute is utilized, namely, that the involute is always perpendicular to a tangent to the base circle of the gear wheel.

A gearing measurement apparatus, with which a similar method can be carried out, is disclosed in European patent publication 0,131,537. The gearing measurement apparatus disclosed in this publication differs from that shown in U.S. Pat. No. 4,852,402, inter alia, in that the probe additionally has a rotational axis about which the probe is rotated when scanning the tooth flanks. The probe is here guided in such a manner that the measurement axis of the probe and therefore the preferred measurement direction of the probe is always guided normally to the involute profile. To control the rotation unit of the workpiece as well as the rotation unit of the probe and the mimic of the probe, the mathematical characteristic of the involute is here likewise utilized so that the involute is, at each point, perpendicular to a tangent to a base circle of the gear wheel.

Swiss Patent 617,264 discloses a movably guided probe having a measuring axis. With the probe, the surface of the workpiece to be measured can be scanned. The probe has a mechanical arrangement via which the measuring axis of the profile measuring probe can be adjusted. To measure a workpiece, the probe is guided by a numeric control in such a manner that the probe is moved on a pregiven path along the workpiece. At the same time, the measuring axis is adjusted in such a manner that the probe exhibits, in each case, a defined preferred measuring direction on the surface of the workpiece. There is no suggestion in this patent as to the generation of the control data.

What is special with respect to the methods and arrangements described is that, when scanning workpieces, a fixed preferred measuring direction with which the probe scans the workpiece can only be realized via complex mathematical individual solutions. This applies also to the solution shown in Swiss Patent 617,264 even though it remains completely unanswered as to how precisely the control data for the corresponding coordinate measuring apparatus are generated. It must be here assumed that either mathematical individual solutions are used in a manner similar to that disclosed in European patent publication 0,131,537 or in U.S. Pat. No. 4,852,402 or the control data arise on the "drafting board".

At this point, it is appropriate to provide a definition of the term "preferred measuring direction". A preferred measuring direction is understood in the following to be that direction in which the probe is deflected out of its desired contour, preferably when there are deviations of the workpiece. For single-axis probes, this direction is fixed by the measurement axis in which the probe can only be deflected. For multi-axes probes wherein the probe pin can be deflected in at least two mutually perpendicular directions, the preferred measurement direction is defined by the measuring force with which the probe pin is pressed upon the surface of the workpiece. In case of optical probes having a scanning beam, the preferred measurement direction corresponds to the direction of the scanning beam.

SUMMARY OF THE INVENTION

It is an object of the invention to provide a method of the kind described above with which any desired contours can be measured automatically. It is also an object of the invention to provide a coordinate measuring apparatus for carrying out the method of the invention.

The method of the invention is for controlling a coordinate measuring apparatus in accordance with desired data utilizing a movably journalled probe which continuously scans the surface of a workpiece in a scanning point in a preferred measurement direction ($\vec{M}$). Either the probe or the workpiece are additionally rotatably journalled about at least one rotational axis having a first alignment. The method includes the steps of: processing geometric data which include at least points ($P_{ai}$, $P_{bi}$) on the surface of the workpiece with the points ($P_{ai}$, $P_{bi}$) defining a line to be scanned; and, computing control data ($L_{ai}$, $L\alpha_i$ and/or $L_{bi}$, $L\beta_i$) from the geometric data for controlling the measuring sequence in such a manner that, for measuring the workpiece, the workpiece and/or the probe are rotated about the rotational axis.

The basic idea of the method of the invention is seen in that control data for controlling the measuring sequence are generated on the basis of geometric data in such a manner that, to measure the workpiece, the workpiece and/or the probe, inter alia, are rotated about the rotational axis. This geometric data include at least points of the surface of the workpiece to be measured and these points define the line on the workpiece surface which is to be scanned by the probe.

The method of the invention achieves significant advantages when compared to the conventional state of the art. Accordingly, with the method of the invention, any desired line of a workpiece to be measured can be measured while using at least one rotation unit without having to look for or prepare individual solutions for this purpose which are different for different contours. Furthermore, the lateral contours of a workpiece can be measured without it being necessary to exchange probes.

The control data are determined in the method of the invention in such a manner that the projection of the preferred measuring direction on a normal plane and the projection of a normal vector, which stands in the scanning point normally to the workpiece surface on the normal plane, conjointly define a specific scan angle. This normal plane lies orthogonally to the rotational axis.

In this way, it is ensured that the probe in the plane, which lies orthogonally to the rotational axis or to the rotational axes, will find the same measuring conditions at each scanned point. The scan angle should preferably be 0° or 180° because, in this way, optimal measuring conditions are present. For a one-axis probe or for a corresponding optical probe having a scanning beam fixed with respect to the probe, this means that the measuring axis always points normally to the workpiece surface in a direction standing at least orthogonally to the rotational axis. For a multi-axes probe, this means that the adjusted measuring force is directed always normally to the workpiece surface in a direction standing in the orthogonal to the rotational axis.

The probe angle is adjusted for each point via suitable rotation of the probe and/or rotation of the workpiece. To compute the control data, the workpiece is, in a first variation, rotated about the rotational axis until the projection of the normal vector of the affected point on the normal plane assumes the scan angle to the projection of the preferred measuring direction fixed with respect to direction to the projection on the normal plane. In a second variation, the probe is rotated until the projection of the preferred measuring direction assumes the above-mentioned scan angle with respect to the projection of the normal vector in the normal plane. This last projection is fixed in this case with respect to direction. Of course, in a third variation, the workpiece as well as the probe can be rotated simultaneously until the scan angle is coincident. For this purpose, for example, the rotational angle can be determined about which the workpiece alone must be rotated in order to arrive at the scan angle. The workpiece then is rotated by the half of the determined rotation angle and the probe is rotated correspondingly about the other half of the determined rotational angle.

There are different procedures which can be followed to compute the corresponding rotational angle.

In a very simple version, the rotational angles can be computed directly from the angle which the points defining the line to be scanned define with the rotational axis about which the workpiece is rotated. The method is, however, only usable in a limited manner because this method can be applied only for lines which are to be scanned which exhibit an approximately constant distance at each point (to be scanned) to the rotational axis. For example, this method can be applied for circular cylinders having a symmetrical axis located precisely on the rotational axis.

The rotational angle can likewise be computed from normal vectors which give a direction, which is normal to the workpiece surface, at each defined point of the line to be scanned. The rotational angle is determined from the angle of the normal vectors projected into the normal plane. The normal vectors necessary for this purpose are likewise part of the geometric data in coordinate measuring apparatus having a multi-axes probe and are transferred to the control of the coordinate measuring apparatus in order to adjust the measuring force with which the probe ball is pressed against the workpiece surface. This is explained in greater detail below. Even though this method is not tied to the geometry of the workpiece, the method however presents the disadvantage that the normal vectors can only then be used when they are not parallel to the rotational axis having the first-mentioned alignment. If, for example, the horizontal side of a workpiece (journalled on a rotation unit having a vertical rotation axis) is to be measured, then the normal vectors likewise point in the vertical direction so that the angle between the projected normal vectors is 0°.

For the above reason, and in another advantageous embodiment, a scanning line is determined between the points defining the line to be scanned. Further, for the determination of the rotational angles in the points defining the scanning line, tangent vectors on the scanning line are determined and the rotational angles are determined from the angles between the tangent vectors, projected on the normal plane. In this way, a method is provided which is substantially independent of the geometry of the workpiece as well as of the line to be scanned.

While considering the rotational angles so determined, path points can now be determined via vector arithmetic and these points define the path which is to be scanned by the probe. On the basis of the path points, the position desired values are then determined for the control of the probe and, on the basis of the corresponding rotational angles, rotational angle desired values are determined for the control of the rotational angles of the rotation unit or the rotation units in such a manner that the probe does not exceed a fixed maximum path speed and a fixed maximum path acceleration and that the rotation unit does not exceed a determined maximum angular speed and a fixed maximum angular acceleration.

The method described functions without difficulty in cases wherein the angle of the normal vectors with respect to the rotational axes of the first alignment is not changed. However, for the case that the angle changes, problems result because the preferred measuring direction only in the direction standing in the orthogonal on the rotational axis encloses the fixed scan angle with the corresponding component of the normal vector. In a parallel direction, the probe angle would thereby change. In order to alleviate this problem, several possibilities exist. One of the possibilities is that a multi-axes probe is used and the measuring force, which is applied by the probe, is varied in dependence upon the surface normal in such a manner that the measuring force always stands perpendicular to the workpiece surface.

A preferred solution to the problem results, however, when the probe is rotatable about a further rotational axis which is orthogonal to the rotational axis having the first direction. In this way, the probe can be so traveled at any time with respect to the workpiece that the preferred measuring direction not only encloses the above-mentioned probe angle in a direction standing orthogonal to the rotational axis, but also stands spatially at a fixed angle to the normal vectors. The corresponding rotational angle about which these additional rotation units must be rotated can be computed completely similar from the angle of the projections of the normal vectors described above or, still better, of the tangent vectors described above to a normal plane standing perpendicular to the further rotational axis. The path points can then be simply determined via simple vector arithmetic in the manner described below.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
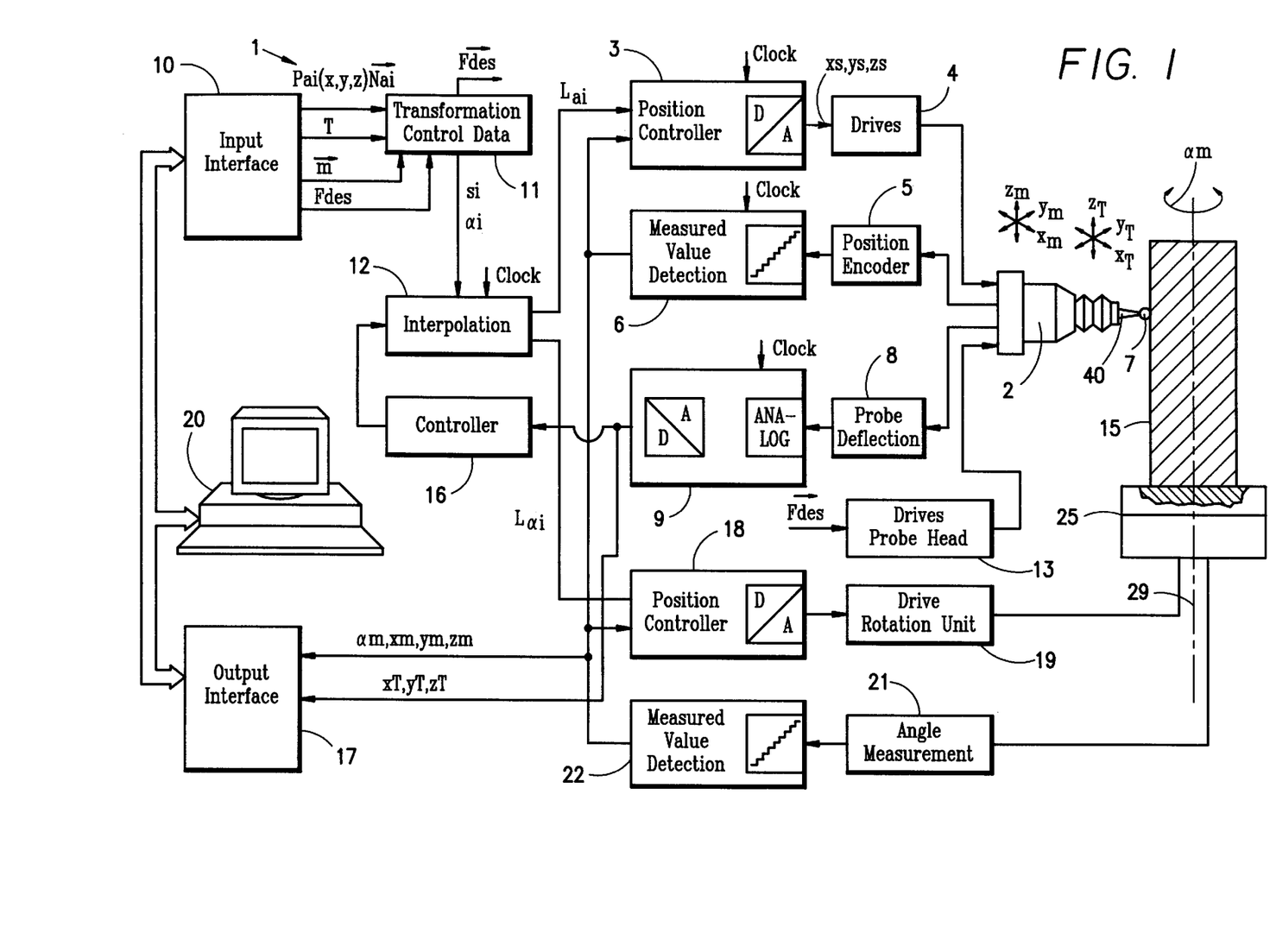
FIG. 1 is a schematic block diagram of a control apparatus of the invention with which the workpiece can be rotated by a rotation unit 25.

FIG. 1 shows a simple schematic of the control 1 of a coordinate measuring apparatus according to the invention. The apparatus control moves a probe head 2 having a probe pin 40 in accordance with desired data. The probe pin is movably attached to the probe head and the probe pin includes a probe ball 7. The control 1 further moves a workpiece 15 in accordance with desired data. The workpiece 15 is journalled on a rotation unit 25 which is rotatably journalled about a rotational axis 29.

The precise function of the coordinate measuring apparatus is explained below. The control 1 of the coordinate measuring apparatus is connected to the evaluation computer 20 of the coordinate measuring apparatus via the input interface 10 and the output interface 17. The data listed below are transferred from the computer 20 via the input interface 10 to the control 1:

(a) the transformation matrix T which describes the position of the workpiece coordinate system (WKS) in the machine coordinate system (MKS) of the coordinate measuring apparatus;

(b) the vector $\vec{m}$ which defines the offset of the center point of the probe ball 7 in the machine coordinate system (MKS) from a reference point on the probe head 2 of the coordinate measuring apparatus;

(c) the amount of the desired measurement force $\vec{F}des$ which the probe pin 40 (or the probe ball 7 attached to the probe pin 40) applies to the workpiece 15 to be scanned.

Furthermore, the data are transferred via the input interface 10 which are necessary for describing the desired contour to be scanned by the probe ball 7. These are, for example, point sequences Pai (x, y, z). At the same time, and insofar as available, normal vectors $\vec{N}i$ can be transferred which correspond to respective individual points Pai (x, y, z). These normal vectors describe the normal direction to the surface of the workpiece 15, which is to be measured, at the particular points.

The most important component of the control are one or several microprocessors. As a consequence, several function component groups, which are noted in FIG. 1, are not realized as hardware; instead, they are parts of the firmware of these microprocessors. This applies, for example, also to the function 10) component group 11 entitled "transformation control data" which follows the input interface 10. From the received data, the function component group 11 "transformation control data" computes the path data Sai with which the probe ball 7 is moved with respect to the workpiece 15 as well as the corresponding rotation data αi in accordance with which the workpiece 15 is rotated about the axis 29 on the rotation table 25. These path data Sai and rotation data αi are transmitted via a transformation to the control system, that is, the machine coordinate system (MKS).

In the function component group 12 "interpolation", the processed discrete path data Sai which are to be traveled as well as the rotation angle data αai are interpolated at the system clock frequency of the component group in accordance with a pregiven algorithm (for example, linear or according to a spline algorithm) and position desired values Lai and rotation angle desired values Lαi are transmitted to the downstream position controller 3 for the drives of the three measuring axes of the coordinate measuring apparatus as well as to the position controller 18 for the drive 19 of the rotation unit 25.

The position desired values, which are generated in the position controller, are subsequently converted from digital to analog and are transmitted as analog actuating variables to the three drives 4 for the x, y and z axes of the coordinate measuring apparatus. The position encoders 5 of the coordinate measuring apparatus are likewise connected to the position controller 3 with this connection being via the function component group 6 "measurement value detection". This function component group 6 ensures a cyclical detection of the machine positions (xm, ym, zm), that is, of the positions of the probe head 2 in the machine coordinate system MKS and closes the position control loop for the three measurement axes of the coordinate measuring apparatus.

In the same manner, the position desired values, which are generated in the position controller 18, are converted from analog to digital and, as analog actuating variables, are transmitted to the drive 19 of the rotation unit 25 for adjusting the rotational table position αm via the axis 29. Likewise, the angle measuring system 21 is connected to the position controller 18 via the function component group 22 "measurement value detection". This function component group 21 ensures a cyclical detection of the rotational table position αm.

The control 1 of FIG. 1 likewise includes the electronics 8 for further processing the signals which are outputted by the measurement value transducers in the probe head 2. These signals define the deflection of the probe (2, 7, 40) upon contact of the probe ball 7 with the workpiece 15 in the three spatial directions. The probe ball 7 is attached to the probe pin 40. The position signals come from the measurement value transducers and are processed in the electronics. These position signals are converted into digital signals in the function component group 9 and are referred to in the following as the probe deflections (xT, yT, zT). The probe deflection (xT, yT, zT) is applied to the output interface 17 in the same manner as the machine positions (xm, ym, zm) and the rotation table position αm. These probe deflections (xT, yT, zT) are needed by the computer 20 to compute the measurement result.

The control 1 furthermore includes the drives for the deflection of the probe pin 40 in the probe head 2. These comprise force generators such as linear motors or solenoid magnets. The drives deflect the probe pin 40 in response to a pregiven signal in the three spatial directions (x, y, z). The corresponding function component group 13 "drives probe head" receives the data as to magnitude and direction of the measurement force $\vec{F}des$ which is to be adjusted likewise via the function component group 11 which generates this data from the transmitted data $\vec{F}des$ as to the magnitude of the measurement force and from the normal vector $\vec{N}i$. In the manner described above, the direction of the measurement force $\vec{F}$des is always pregiven in the direction of the surface normal vector $\vec{N}$i.

A controller 16 is additionally provided in the control. The controller 16 is connected to the output of the function component group 9 "A/D-converter". The probe pin deflection (xT, yT, zT) is monitored by the controller 16. If the probe pin deflection (xT, yT, zT) exceeds a defined limit value, then the controller 16 switches a disturbance quantity to the interpolator 12 so that the probe head is displaced away from the workpiece 15 to be measured by a corresponding amount.

A control without the rotation unit 25 and the component groups (18, 19, 21 and 22) corresponding thereto is described in detail in U.S. Pat. No. 5,471,406 which is incorporated herein by reference.

The additional rotation unit 29 and the function component group assigned thereto relate to a component which is described, for example, in U.S. Pat. No. 4,852,402 which is incorporated herein by reference. This is a component known in coordinate measurement technology for many years under the term "rotation table". The component is also part of a coordinate measuring apparatus made by Carl Zeiss and available under the product designation "UPMC" which stands for "Universal Precision Measurement Center".

The precise operation as to how the function component group 11 "transformation control data" computes the path data Sai as well as the rotation angle data αi for this control and how the function component group 12 "interpolation" computes the position desired values Lai and the rotation angle desired values Lαi will now be explained in greater detail with respect to FIGS. 2 to 4. In the embodiment shown here, the workpiece 15 is measured in a plane orientated orthogonally to the rotational axis 29. The workpiece 15 here is exemplary and is a turbine blade.

Figure 2:
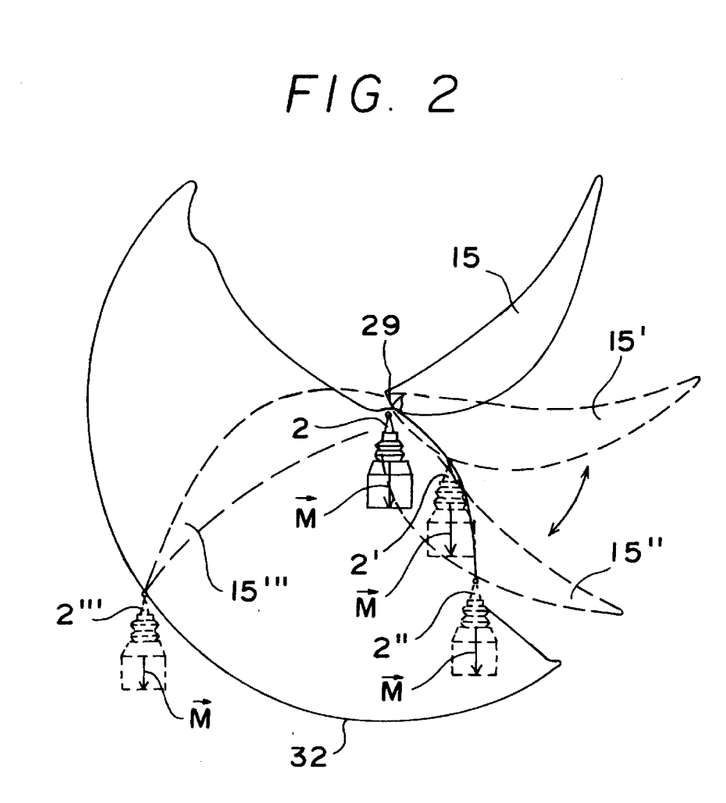
FIG. 2 is an exemplary description of the measuring sequence for a workpiece 15 utilizing the control of FIG. 1.

In FIG. 2, the path 32 can be seen along which the scanning point of the probe ball 7 is driven in accordance with the method of the invention. The path here is computed in such a manner that the preferred measuring direction $\vec{M}$, in which the probe ball is deflected (when there is a deviation of the actual form of the workpiece 15 from a pregiven desired form), is coincident with the longitudinal axis 33 of the probe (2, 7, 40). The preferred measuring direction $\vec{M}$ corresponds here to the applied measuring force $\vec{F}$des and is only transposed with respect to direction.

In order to achieve this, the workpiece 15 must be rotated in such a manner about the rotational axis 29 of the rotation unit 25 that, in the particular scanning points, in which the probe ball 7 scans the surface of the workpiece 15 to be measured, the workpiece surface is normal to the measuring direction. Individual, arbitrarily shown rotation positions of the workpiece 15 are identified by reference numerals (15, 15', 15", 15'") and the corresponding positions of the probe (2, 7, 40) are identified by positions (2, 2', 2", 2'"). The position desired values Lai according to which the probe head 2 is driven and the rotation angle desired values Lαi corresponding thereto in accordance with which the rotation unit 25 is rotated are all computed. Precisely how these position desired values and rotation angle desired values are computed will now be explained in greater detail with respect to FIGS. 3 and 4.

Figure 3:
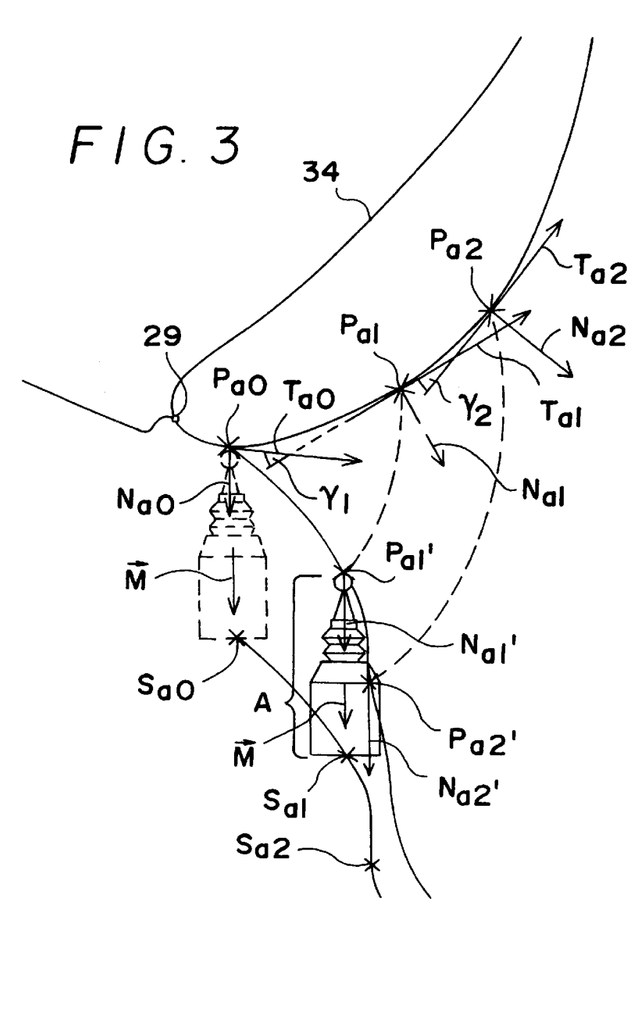
FIG. 3 shows the procedure for generating the path data for the probe (2, 7, 40) and the rotational angles corresponding thereto for the rotation unit 25.

As shown in FIG. 3, the points Pai as well as the normal vectors $\vec{N}$ai are transmitted originally to the control 1 by the computer 20 as geometric data. These data define the line to be scanned on the surface of the workpiece 15. For clarity, in FIG. 3, only the three points (Pa0, Pa1, Pa2) are shown. It is understood that the points Pai shown here are only schematically represented in order to explain the principle of the invention and that the points actually lie much closer to each other. After the transfer of the geometric data to the function component group 11 "transformation control data" from the computer 20 via the input interface 10, a scanning line 34 is determined in the function component group 11 "transformation control data" from the points Pai. It is along this scanning line 34 that the scanning point of the probe ball 7 is then guided over the workpiece 15. For this purpose, the points Pai are connected with each other, for example, via Bezier splines so that the scanning line 34 can be thereby determined.

In a next step, tangent vectors $\vec{T}$ai are determined for the scanning line 34. These vectors are tangent to the determined scanning line 34 at the corresponding points Pai. The alignment of the tangent vectors $\vec{T}$ai is computed in the example shown in the travel direction of the scanning point.

In a next step, the points Pai are computer rotated about the rotational axis 29 until the normal vectors $\vec{N}$ai stand with respect to the defined preferred measuring direction $\vec{M}$ at an angle of 0° or the tangent vectors $\vec{T}$ai are at an angle of 90° so that the surface of the workpiece in the case shown here is always normal to the preferred measuring direction $\vec{M}$ at the corresponding points Pai'. The rotational angle αi about which the particular point Pai must be rotated results then from the angles γi of the tangent vectors Tai with respect to each other. As shown in FIG. 3, the angle γ1 between the tangent vectors (Ta0 and Ta1) corresponds to that rotational angle α1 about which the point Pa1 must rotate about the rotational axis 29 so that the tangent vector Ta1 (or the normal vector Na1) has the same alignment as the tangent vector Ta0 (or the normal vector Na0). In the same manner, the rotation angle α2 for the point Pa2 results from the sum of the angles γ1 and γ2 between the tangent vectors (Ta0 and Ta1 as well as Ta1 and Ta2), et cetera.

The rotated points Pai' hereby define a line on which the scanning point of the probe ball 7 is guided during scanning of the workpiece 15. From the rotated points Pai', the path points Sai of the particular path, on which the probe 2 is moved, can be computed via vector arithmetic. Thus, the position of the scanning point Pai of the probe ball 7 can be described in a fixed relationship with respect to the path points Sai and can be defined by an offset vector not shown here for the sake of clarity. The path points Sai can now easily be determined in that the offset vector is added to the location vector of the rotated points Pai'.

Figure 4A:
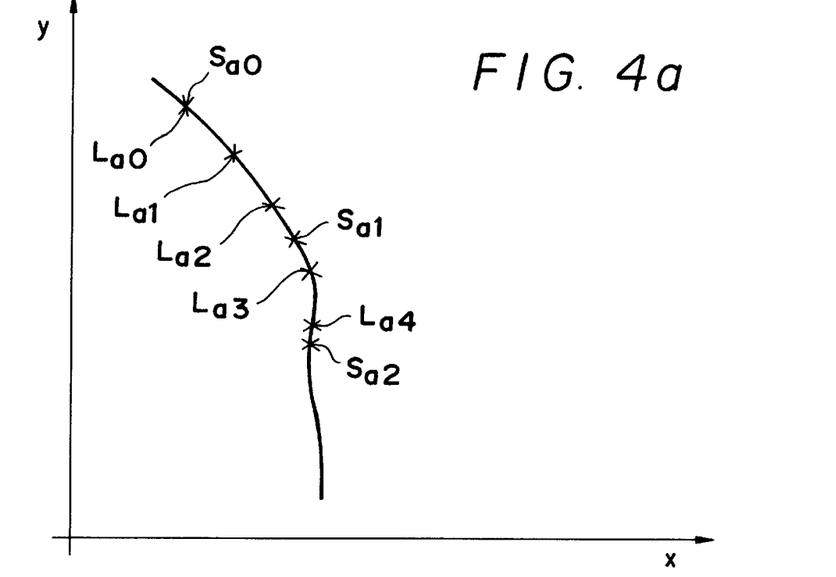
FIGS. 4a and 4b show the procedure for determining the position desired values (Lai) for the probe (2, 7, 40) and the rotation angle desired values (Lαi) for the rotation unit 25.
Figure 4B:
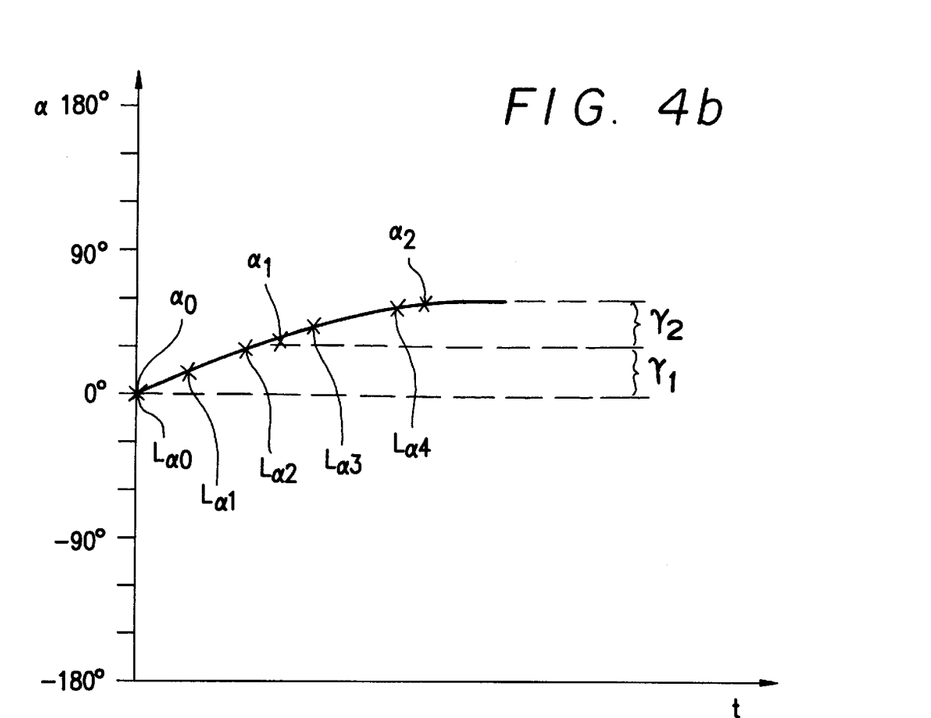

A segmental illustration of the path points Sai determined in the above manner is plotted in FIG. 4a and the rotation angles αi corresponding thereto are plotted in FIG. 4b. The computed path points Sai and rotation angles αi are transferred from the function component group 11 "transformation control data" shown in FIG. 1 to the function component group 12 "interpolation" wherein position desired values Lai for the axis control of the probe 2 are generated as well as the rotation angle desired values Lαi for the rotation table control.

For this purpose, the path points Sai and the rotation angle points αi are interpolated via splines so that a curve is obtained in this manner. In a next step, position desired values Lai are generated on one of the above-mentioned curves, preferably on the curve having the path points Sai for the probe. The position desired values Lai later define the position of the probe (2, 7, 40), which is fixed by the axis control, and are utilized during measuring tasks in such a manner that the probe (2, 7, 40) moves in a fixedly defined clock frequency from position desired value Lai to the next position desired value Lai+1. The position desired values Lai are here generated in such a manner that the probe (2, 7, 40) does not exceed a maximum permissible path speed and, likewise, also does not exceed a maximum permissible path acceleration as described in detail in U.S. Pat. No. 5,726,917 incorporated herein by reference.

A difference to the method described in U.S. Pat. No. 5,726,917, is that in the method described herein, rotational angle desired values Lαi must be fixed in addition to the corresponding position desired values Lai. For this reason, a corresponding rotational angle desired value Lαi is computed directly after the determination of each desired value Lai. The computation takes place in such a manner that, for each determined position desired value Lai, the relationship is determined in which this position desired value Lai partitions the line between the two bordering path points Sai and Sai+1 and corresponding to the division ratio between two rotation angles, which correspond to the corresponding path points, a corresponding rotation angle desired value Lαi is obtained which partitions the curve between the two corresponding rotational angles (αi and αi+1). With respect to position desired angle Lαi generated in this manner, it must be further investigated whether, on the one hand, the angle speed, which is generated by the newly inserted position desired angle Lai, exceeds a maximum value as well as if the angle acceleration corresponding thereto exceeds a maximum value. If this is the case, then the spacings of the position desired values Lai must be corrected until the conditions with respect to maximum angle speed and maximum angle acceleration are maintained.

As already described above, the measuring method can then be carried out on the basis of the position desired values Lai and rotation angle desired values Lαi generated as delineated above.

Figure 5:
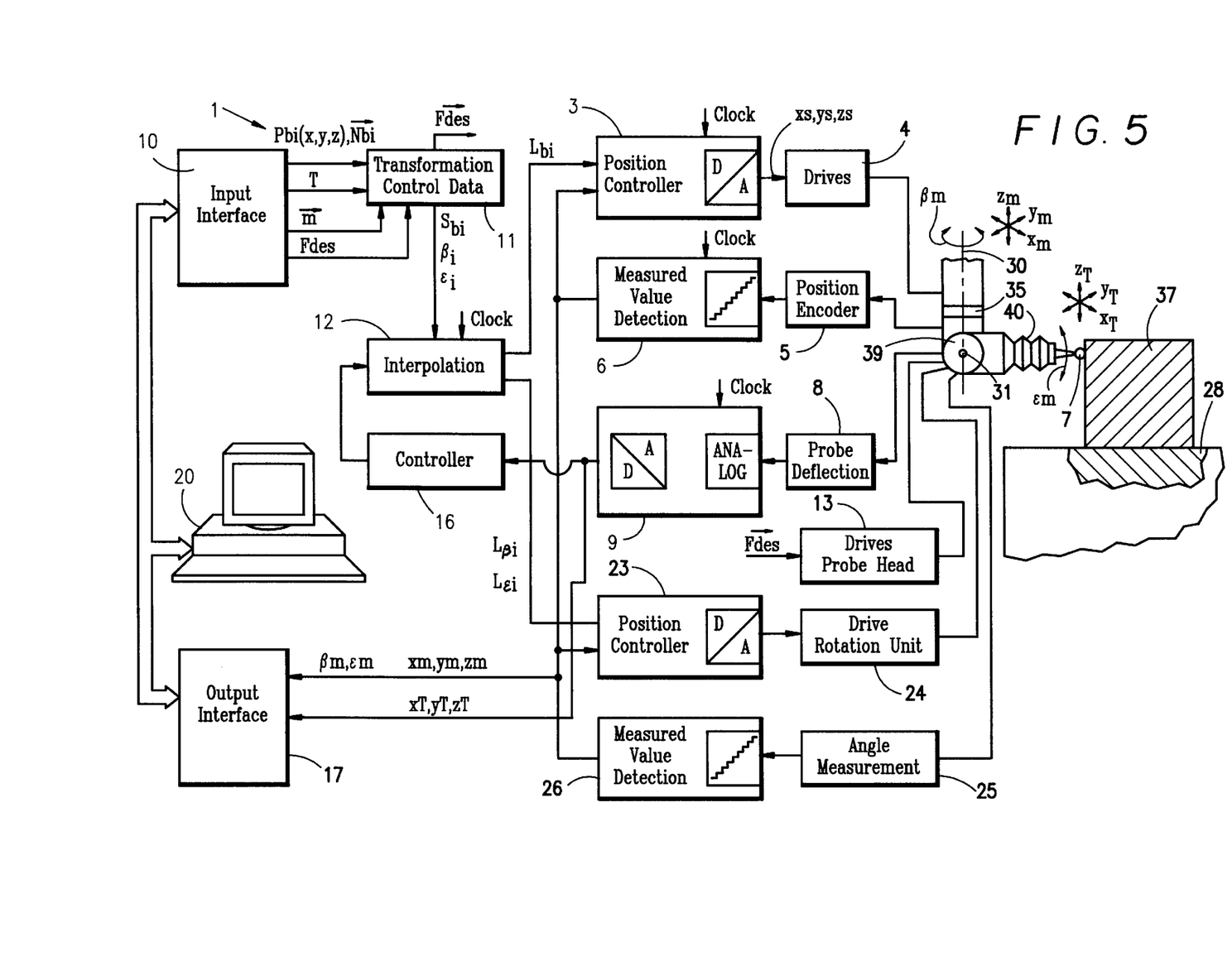
FIG. 5 is a block diagram of another embodiment of a control of the invention wherein the probe head 2 can be moved about at least one rotational axis 30.

FIG. 5 shows another variation of the control 1 of the invention wherein the probe (2, 7, 40) can be rotated by a rotation unit 35 about a rotational axis 30 in the direction of arrow βm. In addition, a rotation unit 39 is provided via which the probe (2, 7, 40) can also be pivoted along the arrow εm.

The drive of the rotation unit 35 and the pivot unit 36 takes place in a manner similar to the rotation table 25 via the function component groups (23, 24, 25, 26).

A corresponding rotation unit is disclosed, for example, in U.S. Pat. No. 4,888,877 incorporated herein by reference.

Furthermore, the control of FIG. 5 differs in that the function component group 11 "transformation control data" determines the path points Sbi and the rotational angles (βi, εi) in another manner than this is done by the function component group 11 of FIG. 1.

The precise operation for the computation of the position desired values Lbi and the rotational angle desired values Lβi will now be described with reference to FIG. 6.

In the same manner as in FIG. 1, the points Pbi, which define a line to be scanned on the workpiece surface, are transferred from the computer 20 via the input interface 10 to the function component group 11 "interpolation". In the same manner as above, a scan line 38 is computed via splines and the corresponding tangent vectors Tbi to the corresponding points Pbi are determined.

Figure 6:
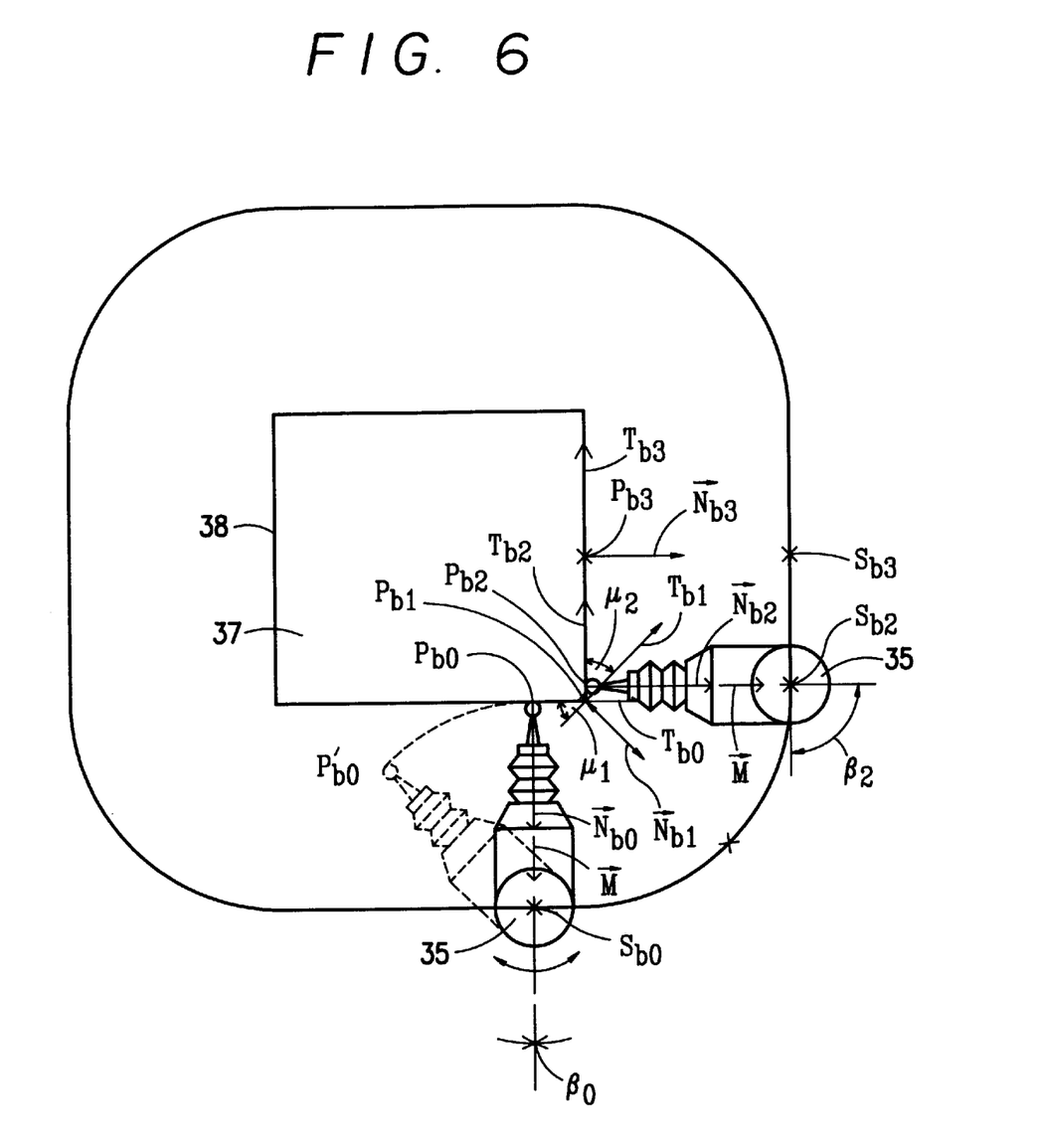
FIG. 6 shows the measuring sequence for the measurement of a workpiece 37 utilizing a control in accordance with FIG. 5; and, FIG. 7 shows the procedure for generating the position desired values (Lbi) for the probe (2, 7, 40) and the rotational angle desired values (Lβi) for the rotation unit 35.

At this point, it should be again noted that FIG. 6 is strictly a schematic representation for explaining the method of the invention and that the points Pbi actually lie closer together.

In the embodiment shown here, the points Pbi correspond to the points to be scanned by the probe ball 7. The following will explain the procedure to be followed to compute the path points Sbi on which the rotation unit 35 is guided and the corresponding rotational angles βi about which the rotation unit 35 is rotated.

First, one proceeds from a start position in which the probe ball 7 touches the workpiece 37 in the first point Pb0 at the desired probe angle which can likewise be selected as 0°. The precise position allocation of the scan point of the probe ball 7 and the path point Sb0 is here too described via a suitable offset vector having constant length. However, the direction of the offset vector changes continuously during the measurement sequence in correspondence to the rotational angle of the rotation unit 35.

To determine the path points Sbi and the rotational angles βi, a rotation angle βi is determined from the angles pi between the tangent vectors $\vec{T}$bi (in a manner similar to the example shown in FIG. 1) about which the probe head (2, 7, 40) must be rotated in the particular point Pbi by the rotation unit so that the preferred measuring direction $\vec{M}$ and, in the embodiment shown here, the normal vector $\vec{N}$bi conjointly define the probe angle (which can be defined as 0° in the same manner as above). The new path point (Sbi+1) is then determined via vector arithmetic while considering the rotational angle.

The possibilities of determining the path points are many and are explained here as an example according to a variation with respect to the change from point Pb0 to the point Pb1. First, and in a manner similar to that shown in FIGS. 1 to 4, a corresponding rotation angle β1 is determined which is equal to the angle μ1 between the tangent vectors ($\vec{T}$b0 and $\vec{T}$b1). Starting from the first point Pb0 to be scanned, an intermediate point Pb0' is computed which is generated by rotation of the point Pb0 about the path point Sb0 by the rotation angle β1. The new path point Sb1 can now be simply determined in that a new offset vector is determined between the position vector of the intermediate point Pb0' and the position vector of the path point Sb0. The new offset vector then corresponds to the original offset vector rotated by the rotation angle β1 and the new offset vector determined in this manner is added to the position vector of the point Pb1.

The same procedure is followed for the computation of the next path points (Sb2, Sb3, et cetera).

Figure 7A:
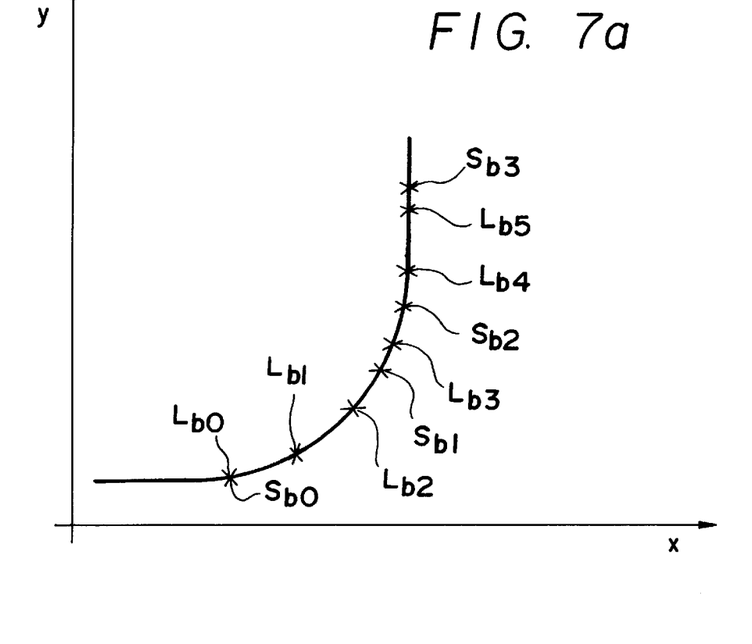
Figure 7B:
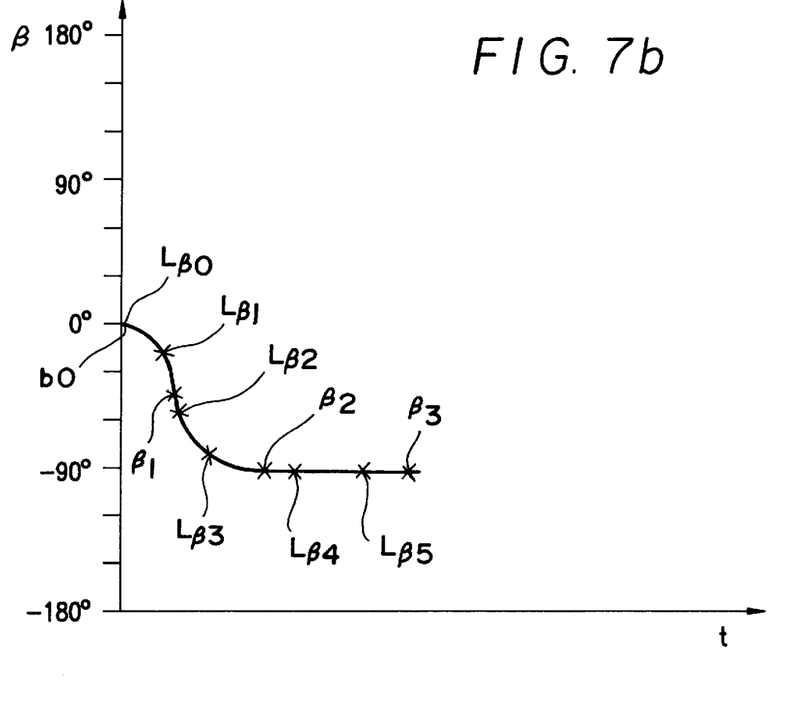

In FIG. 7a, the corresponding path points (Sb$_0$–Sb$_3$) are shown sectionally for the points (Pb$_0$–Pb$_3$); whereas, in FIG. 7b, the rotation angles (β$_0$–β$_3$) of the rotation unit 35 are shown. These rotation angles (β$_0$–β$_3$) correspond to the path points (Sb$_0$–Sb$_3$).

The position desired values Lbi as well as the corresponding rotation desired values Lβi over which the probe (2, 7, 40) is then control driven, are computed in a manner similar to the above procedure. Here too, splines are first inserted for the path points Sbi and the rotation angles βi between the corresponding points and the splines fix the trace of the corresponding curves.

In a next step, position desired values Lbi are inserted between the path points Sbi in such a manner that the probe does not exceed a maximum permissible path speed as well as a maximum permissible path acceleration during the processing of the position desired values Lbi. After each newly inserted position desired value Lai, a corresponding rotational angle desired value Lβi (corresponding to the ratio in which the value Lai partitions the distance between the two corresponding path points (Sbi and Sbi+1)) is determined in correspondence to the corresponding path for the rotational angles and, with respect to the rotation angle desired value L$\beta$i, a check is also made as to whether the newly inserted rotation angle desired value L$\beta$i satisfies the requirements with respect to maximum angle speed of the rotation unit 35 and with respect to maximum angle acceleration of the rotation unit 35. If this is not the case, then the position desired value Lbi, which is newly inserted in the path curve, is correspondingly corrected and the method is carried out in the same manner until the requirements with respect to maximum speed and maximum acceleration in both curves are satisfied.

In the embodiments shown here, the entire measurement has been shown to demonstrate the method of the invention on very simple examples. On the one hand, the lines (34, 38) lie in a plane lying normal to the rotational axes (29, 30). On the other hand, the workpiece surface is so configured that the normal vectors ($\vec{N}$ai, $\vec{N}$bi), the tangent vectors ($\vec{T}$ai, $\vec{T}$bi) as well as the preferred measuring direction $\vec{M}$ are orthogonal on the corresponding rotational axis (29, 30) with the first alignment, so that, for the examples shown, the shown vectors can be directly utilized.

The line to be scanned can, however, also vary in the direction of the rotational axes 29 or 30. Here, and in lieu of the normal vectors ($\vec{N}$ai, $\vec{N}$bi), the tangent vectors ($\vec{T}$ai, $\vec{T}$bi) as well as the preferred measurement direction $\vec{M}$, the projections of the affected vectors on a normal plane have to be used which plane is orthogonal to the rotational axis (29, 30). For this more general case, the following likewise again applies that the position desired values (Lai, Lbi) and the rotational angle desired values (L$\alpha$i, L$\beta$i) are computed in such a manner that the projection of the preferred measuring direction $\vec{M}$ on a normal plane lying orthogonally to the rotational axis and the projection of a normal vector ($\vec{N}$ai, $\vec{N}$bi) standing in the scanning point normal to the workpiece surface define a specific angle.

Furthermore, it is understood that a line to be scanned can be traveled over for which the angle between the normal vectors and the rotational axis (29, 39) is varied. In order to travel over a line of this kind, the preferred measuring direction $\vec{M}$ must be correspondingly adjusted.

This can take place in that a multi-axis probe (2, 7, 40) is used as shown in FIGS. 1 and 5. With this probe, the measuring force $\vec{F}$des, which acts on the surface of the workpiece, can be correspondingly adjusted. The adjustment of the measuring force $\vec{F}$des takes place either as described above via measuring force generators (see function component group 13, "drives probe head") or via a corresponding deflection of the probe pin 40 when the measuring force is generated via the return force of the springs of the probe itself.

For the case that the preferred measuring direction $\vec{M}$ is to be held constant, the probe (2, 7, 40) can be pivoted about a further rotation unit 39. The rotational axis 31 of this rotation unit 39 is orthogonal to the rotational axis of the other rotation unit 35. Via this rotational axis, the probe 2 can now always be additionally so displaced that the preferred measuring direction $\vec{M}$ no longer has to be varied. The corresponding rotation angles by which the rotation unit 39 must be rotated can be computed from the angle of the projections of the above-described normal vectors ($\vec{N}$ai or $\vec{N}$bi) or, better yet, the above-described tangent vectors ($\vec{T}$ai or $\vec{T}$bi) on a normal plane perpendicular to the additional rotational axis 31. The path points can then be determined simply via vector arithmetic in the same manner as described above.

The rotation units (35 and 39), which are shown only as exemplary in FIG. 5, can be provided for the same purpose also in the control of FIG. 1. If it is intended here to simultaneously rotate the workpiece 15 by the rotation unit 25 as well as the probe 2 by the rotation unit 35 until the probe angles are coincident, then, for example, the rotational angle can be determined as described above, by which either the workpiece 15 alone or the probe (2, 7, 40) alone are to be rotated in order to achieve the probe angle. The workpiece 15 is then rotated by half of the determined rotational angle and the probe is rotated by the other half of the determined rotational angle.

It is understood that the foregoing description is that of the preferred embodiments of the invention and that various changes and modifications may be made thereto without departing from the spirit and scope of the invention as defined in the appended claims.

What is claimed is:

1. A method for controlling a coordinate measuring apparatus in accordance with desired data utilizing a movably journalled probe which continuously scans the surface of a workpiece in a scanning point in a preferred measurement direction ($\vec{M}$), either the probe or the workpiece being additionally rotatably journalled about at least one rotational axis having a first alignment, the method comprising the steps of:

processing geometric data which include at least points (Pai, Pbi) on the surface of said workpiece with said points (Pai, Pbi) defining a line to be scanned; and, computing control data (Lai, L$\alpha$i and/or Lbi, L$\beta$i) from said geometric data for controlling the measuring sequence in such a manner that, for measuring the workpiece, said workpiece and/or said probe are rotated about the rotational axis.

2. The method of claim 1, wherein a projection of said preferred measurement direction ($\vec{M}$) is on a normal plane, which lies orthogonal to the rotational axis; and a projection of a normal vector ($\vec{N}$ai, $\vec{N}$bi) which stands normally to the surface on the workpiece in the scanning point on said normal plane; and, said projections conjointly define a scan angle.

3. The method of claim 2, wherein said scan angle is adjusted for each point by suitable rotation of the probe and/or by suitable rotation of said workpiece.

4. The method of claim 1, wherein said points define the line to be scanned; and, wherein a scanning line is determined between said points to compute the control data.

5. The method of claim 4, wherein, to determine the control data in said points, which define the line to be scanned, tangent vectors ($\vec{T}$ai or $\vec{T}$bi) are determined on said scanning line; said tangent vectors ($\vec{T}$ai, $\vec{T}$bi) are projected into a normal plane which lies orthogonally to the rotational axis; and, rotational angles ($\alpha$i, $\beta$i) are determined from the angles ($\gamma$i or $\mu$i) between said vectors projected on said normal plane.

6. The method of claim 1, wherein, to determine said control data, rotational angles ($\alpha$i, $\beta$i) are computed from the angles which the points (Pai), which define the line to be scanned, and the rotational axis form about which the workpiece is rotated.

7. The method of claim 1, wherein, to determine the control data, rotational angles ($\alpha$i, $\beta$i) are computed from normal vectors ($\vec{N}ai$, $\vec{N}bi$) which, at each point, which defines the line to be scanned, define a direction standing normal to the workpiece surface; and, the rotational angles are determined from the angles between the normal vectors projected into said normal plane.

8. The method of claim 5, wherein, to determine said control data and while considering the determined rotational angles, path points (Sbi) are determined, which define the path to be travelled over by said probe.

9. The method of claim 8, wherein, to determine the control data, position desired values (Lai, Lbi) for the control of said probe are determined on the basis of the path points and, on the basis of the corresponding rotational angles, rotational angle desired values (Lαi, Lβi) are determined in such a manner that the probe does not exceed a fixed maximum path speed and a fixed maximum path acceleration and that the rotation unit does not exceed a fixed maximum angular acceleration and a fixed maximum angular velocity.

10. The method of claim 1, wherein said probe is rotatable about a second axis which stands orthogonal to all rotational axes with the first alignment; and, the control data are so determined that the preferred measuring direction is always at a fixed scan angle to normal vectors during the entire measuring sequence which stand normally to the surface on the workpiece in the scanning point on a normal plane which, in turn, lies orthogonally to the rotational axis.

11. The method of claim 1, wherein said probe is a contacting probe or an optical probe.

12. A coordinate measuring apparatus for scanning a workpiece in accordance with desired data, the coordinate measuring apparatus comprising:

a movably guided probe which measures the surface of a workpiece in a scanning point in a definable preferred measurement direction ($\vec{M}$);

at least one rotation unit via which said workpiece and/or said probe are rotated about a rotational axis with a first alignment; and, a control which determines control data on the basis of geometric data, said control data being for controlling the measuring sequence from said geometric data in such a manner that, for measuring the workpiece, the workpiece and/or said probe are rotated about the rotational axis; and, said geometric points (Pai, Pbi) include the points which define the line to be scanned.

13. The coordinate measuring apparatus of claim 12, wherein said preferred measurement direction ($\vec{M}$) forms a projection thereof on a normal plane, which lies orthogonal to the rotational axis; a normal vector ($\vec{N}ai$, $\vec{N}bi$) defining a projection thereof in the scanning point standing normally to the surface of the workpiece; and, said projections conjointly defining a scan angle.

14. The coordinate measuring apparatus of claim 13, wherein the control data are so generated that said probe angle is adjusted for each point by suitable rotation of the probe and/or by suitable rotation of said workpiece.

15. The coordinate measuring apparatus of claim 12, wherein the control for computing the control data between said points, which define the line to be scanned, determine a scanning line.

16. The coordinate measuring apparatus of claim 15, wherein, the control to determine the control data in said points, which define the scanning line, tangent vectors ($\vec{T}ai$ or $\vec{T}bi$) are determined on said scanning line; said tangent vectors ($\vec{T}ai$, $\vec{T}bi$) are projected into a normal plane which lies orthogonally to the rotational axis; and, rotational angles (αi, βi) are determined from the angles (γi or μi) between said vectors projected on said normal plane.

17. The coordinate measuring apparatus of claim 12, wherein the control, to determine said control data, rotational angles (αi, βi) are computed from the angles which the points (Pai), which define the line to be scanned, and the rotational axis form about which the workpiece is rotated.

18. The coordinate measuring apparatus of claim 12, wherein, to determine the control data, rotational angles (αi, βi) are computed from normal vectors ($\vec{N}ai$, $\vec{N}bi$) which, at each point, which defines the line to be scanned, define a direction standing normal to the workpiece surface; and, the rotational angles are determined from the angles between the normal vectors projected into said normal plane.

19. The coordinate measuring apparatus of claim 16, wherein, to determine said control data and while considering the determined rotational angles, path points (Sbi) are determined, which define the path to be travelled over by said probe.

20. The coordinate measuring apparatus of claim 19, wherein, to determine the control data, position desired values (Lai, Lbi) for the control of said probe are determined on the basis of the path points and, on the basis of the corresponding rotational angles, rotational angle desired values (Lαi, Lβi) are determined in such a manner that the probe does not exceed a fixed maximum path speed and a fixed maximum path acceleration and that the rotation unit does not exceed a fixed maximum angular acceleration and a fixed maximum angular velocity.

21. The coordinate measuring apparatus of claim 12, further comprising a further rotation unit via which the probe is rotatably journalled about a rotational axis; and, said rotational axis being orthogonal to all rotational axes.

22. The coordinate measuring apparatus of claim 21, wherein said control unit determines the control data so that the preferred measuring direction is always at a fixed scan angle to normal vectors during the entire measuring sequence which stand normally to the surface on the workpiece in the scanning point on a normal plane which, in turn, lies orthogonally to the rotational axis.

23. The coordinate measuring apparatus of claim 12, wherein said probe is a contacting probe or an optical probe.

24. A method for controlling a coordinate measuring apparatus in accordance with desired data utilizing a movably journalled probe which continuously scans the surface of a workpiece in a scanning point in a preferred measurement direction ($\vec{M}$), either the probe or the workpiece being additionally rotatably journalled about at least one rotational axis having a first alignment, the method comprising the steps of:

processing geometric data which include at least points (Pai, Pbi) on the surface of said workpiece with said points (Pai, Pbi) defining a line to be scanned;

computing control data (Lai, Lαi and/or Lbi, Lβi) from said geometric data for controlling the measuring sequence in such a manner that, for measuring the workpiece, said workpiece and/or said probe are rotated about the rotational axis;

wherein a projection of said preferred measurement direction ($\vec{M}$) is on a normal plane, which lies orthogonal to the rotational axis; and a projection of a normal vector ($\vec{N}ai$, $\vec{N}bi$) which stands normally to the surface on the workpiece in the scanning point on said normal plane; and, said projections conjointly define a scan angle; and, adjusting said scan angle for each point by suitable rotation of the probe and/or by suitable rotation of said workpiece.

25. A coordinate measuring apparatus for scanning a workpiece in accordance with desired data, the coordinate measuring apparatus comprising:

a movably guided probe which measures the surface of a workpiece in a scanning point in a definable preferred measurement direction ($\vec{M}$);

at least one rotation unit via which said workpiece and/or said probe are rotated about a rotational axis with a first alignment;

a control which determines control data on the basis of geometric data, said control data being for controlling the measuring sequence from said geometric data in such a manner that, for measuring the workpiece, the workpiece and/or said probe are rotated about the rotational axis; and, said geometric points (Pai, Pbi) include the points which define the line to be scanned;

said preferred measurement direction ($\vec{M}$) forming a projection thereof on a normal plane, which lies orthogonal to the rotational axis; a normal vector ($\vec{N}$ai, $\vec{N}$bi) defining a projection thereof in the scanning point standing normally to the surface of the workpiece; and, said projections conjointly defining a scan angle; and, the control data being so generated that said probe angle is adjusted for each point by suitable rotation of the probe and/or by suitable rotation of said workpiece.

* * * * *

UNITED STATES PATENT AND TRADEMARK OFFICE
CERTIFICATE OF CORRECTION

PATENT NO. : 6,154,713
DATED : November 28, 2000
INVENTOR(S) : Heinz Peter and Ulrich Staaden It is certified that error appears in the above-identified patent and that said Letters Patent is hereby corrected as shown below:

Title Page,
Item [54], line 2, between "MEASURING" and "IN" insert -- APPARATUS --.
Item [57], line 6, delete "therefore" and substitute -- are -- therefor.

Column 1,
Line 2, between "MEASURING" and "IN", insert --APPARATUS --.

Column 5,
Line 61, delete "10)".

Column 8,
Line 32, delete "(Ta0and" and substitute -- (Ta0 and -- therefor.

Column 9,
Line 27, delete "Lai," and substitute -- Lαi, -- therefor.

Column 10,
Line 14, delete "pi" and substitute -- μi -- therefor.

Signed and Sealed this

Eighteenth Day of December, 2001

Attest:

JAMES E. ROGAN
Attesting Officer   Director of the United States Patent and Trademark Office